US006965932B1

(12) United States Patent
Rajaram et al.

(10) Patent No.: US 6,965,932 B1
(45) Date of Patent: Nov. 15, 2005

(54) METHOD AND ARCHITECTURE FOR A DYNAMICALLY EXTENSIBLE WEB-BASED MANAGEMENT SOLUTION

(75) Inventors: Abhay Rajaram, San Jose, CA (US); Richard A. Fletcher, San Jose, CA (US); Jennifer Lynn Grace, San Jose, CA (US); Ron Vered, Sunnyvale, CA (US)

(73) Assignee: 3Com Corporation, Santa Clara, CA (US)

( * ) Notice: Subject to any disclaimer, the term of this patent is extended or adjusted under 35 U.S.C. 154(b) by 652 days.

(21) Appl. No.: 09/838,488

(22) Filed: Apr. 19, 2001

(51) Int. Cl.[7] .................. G06F 15/173; G06F 15/16
(52) U.S. Cl. .................................. 709/223; 709/217
(58) Field of Search ........................ 709/223–226, 709/217

(56) References Cited

U.S. PATENT DOCUMENTS

| | | | |
|---|---|---|---|
| 6,356,931 B2 * | 3/2002 | Ismael et al. ............... | 709/202 |
| 6,519,638 B1 * | 2/2003 | Forman et al. ............. | 709/224 |
| 6,754,664 B1 * | 6/2004 | Bush ......................... | 707/102 |

OTHER PUBLICATIONS

Panuganty, Ramesh "IIOP: Internet Inter-ORB protocol" Jul. 1998. As downloaded from panuganty.tripod.com/articles/iiop.htm.*
Ivens, Kathy "The Mighty Win2k Microsoft Managment Console, Part 2". Oct. 2000. Article #15529 from www.winnetmag.com/Articles.*

* cited by examiner

*Primary Examiner*—Saleh Najjar
*Assistant Examiner*—David Lazaro
(74) *Attorney, Agent, or Firm*—John W. Carpenter; Reed Smith LLP

(57) ABSTRACT

A framework for extending a network management platform, including an object manager that retrieves an entire class hierarchy including any code or other functionality needed to retrieve data about a server or other network device (e.g., code needed to retrieve actual instances of an object of the class). The object manager holds the object hierarchy and initiates retrieval of actual instances of the object. The class hierarchies are maintained in plug-in type Object Providers. Newly developed network technologies are managed via managed objects defined by class hierarchies held by the Object providers. The Object Provider can be seamlessly installed in an existing extensible network management platform.

22 Claims, 3 Drawing Sheets

METHOD AND ARCHITECTURE FOR A DYNAMICALLY EXTENSIBLE WEB-BASED MANAGEMENT SOLUTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to network management and more specifically to a framework for developing a network management services. The present invention is more particularly related to a framework for developing extensible network management services.

2. Discussion of Background

Networks have become important, strategic foundations for competing in a global economy. And every day, more users and more business activities step into the network realm. Users are demanding that access to the network be delivered with the same simplicity, reliability, quality, and flexibility associated with picking up a phone and calling anywhere in the world.

In this network-centric environment, the behind-the-scenes designers and operators of networks face three concurrent challenges:

Networks are growing larger and more dispersed. With each new user comes another PC, many of them notebooks and a growing number are scattered to remote locations, users' home offices, or all corners of the earth in the hands of mobile workers. While the initial capital cost of PCs gets a lot of attention, the greatest chunk of technology budgets goes to maintaining and managing users' connections. Lowering total cost of ownership (TCO) for a growing PC population means finding a way to simplify and automate management and troubleshooting of desktops, servers, and mobile PCs spread across the business. It also means enhancing the fault tolerance of servers so IS staffs escape the need to constantly fine-tune performance or deal with emergencies.

Networks are growing more complex. New technologies and applications are reaching into corporate networks at an accelerating pace. More users and greedier applications are competing for bandwidth. Fully switched local networks are common. Consequently, it is growing more difficult to monitor performance and pinpoint problems. The terminal-to-host model is long gone, and even the relatively predictable shape and behavior of client-server environments has given way to the more fluid and "fractal" connections that support intranets, Internet connectivity, multimedia, and other emerging applications. It is essential to gain increased visibility into today's complex networks.

Networks are growing more critical. Businesses are using information technology as a competitive advantage. And those that are getting the strongest return on their investment are graduating from e-mail and office applications to business-critical, production applications-process controls, customer service, medical imaging, e-commerce and others. In these situations, near-100-percent network availability is essential the days of overnight outages lasting up to several hours are over.

Along with this need for nonstop networks comes a need for greater control over, and information about, how traffic moves through the network. Companies are deploying applications such as enterprise resource planning (ERP), sales automation, e-commerce, distributed training, and voice-over-IP (VoIP) at a rapid pace. This business-critical and, in the case of voice and video, delay-sensitive traffic needs to move through the network unobstructed by lower-priority activities such as e-mail or Internet browsing.

Therefore, IS managers need tools capable of providing network support for these critical business objectives on an immediate real time basis. The supporting information is preferably provided in an intuitive format that allows the managers to quickly find the needed information with simple searching and a minimum of additional research. However, because of display complexities, and lack of available tools, the data presented to IS managers is not presented as effectively as is preferred to allow quick and easy access to the data needed for making proper network management decisions. Furthermore, many of the network devices and deployed applications are newly developed, and may use new or advanced protocols, methods, and types of data. However, network management devices are typically set-up to use a specific communication technique or, protocol suite, leaving little or any variation for improved methods. For example, U.S. Pat. No. 6,058,314 provides a network management device that is set up for a known application or protocol and gather data in a specific format for that application/protocol. Unless specifically developed for a particular application, protocol, method, or data type, existing management programs are either inefficient, unprepared, or unable to properly manage the new devices and/or applications.

SUMMARY OF THE INVENTION

The present inventors have realized the need for a framework for extending network management devices to new technologies and protocols as they are developed. The present invention includes a network management framework that is dynamically extensible for at least new network features, new network device types, and new networking technologies and protocols.

Instead of being programmed to work with specific devices or protocols, the invention includes an object manager that retrieves objects having an entire class hierarchy including any code or other functionality needed to retrieve data about a server or other network device (e.g., code needed to retrieve actual instances of an object of the class). The object manager holds the retrieved object and initiates retrieval of actual instances of the object. Retrieval of the object instance is, for example, performed using a class function.

In one embodiment, a proxy is utilized to collect data from one or more managed devices on the network, and the class function for the object retrieves the class instance from the proxy. In another embodiment, the class function contains all the programming necessary to directly request data from the managed devices and build the object instance.

The present invention is embodied as a framework for a network management device, comprising, an object repository having a set of at least one object class definition, each object class definition containing information needed to retrieve instances of an object defined by the corresponding object class definition and configured to maintain data regarding at least one managed device on a network, an object manager configured to retrieve at least one object class definition from the object repository and initiate at least one class function of the retrieved objects to retrieve at least one class instance, and an interface configured to retrieve data from the class instances and forward it to a user of the network management device.

The present invention includes a module for use in an extensible network management device, comprising, at least one class definition, including, a data storage definition configured to hold data needed to evaluate at least one aspect of a device, at least one routine configured to retrieve data for the data storage, and at least one routine that provide access to the data storage for display by the extensible network management device.

The present invention also includes a method of retrieving network management information, comprising the steps of, determining a set of information needed for network management, loading at least one object having a class hierarchy and class routines capable of retrieving and maintaining the needed network management data into an object manager, invoking class routines for retrieving an instance of the object, and forwarding the needed management data to a user.

Both the device, object, and method may be conveniently implemented on a general purpose computer, or networked computers, and the results may be displayed on an output device connected to any of the general purpose, networked computers, or transmitted to a remote device for output or display. In addition, the processes of the present invention may be embodied in a set of electronic signals transmitted using any of wireless, wired, optical, or other communication devices.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention provides a framework for extending network management devices to new technologies and protocols as they are developed. Rather than being tied to specific procedures or protocols for retrieving network management information, the present invention defines an open framework in which plug-in modules are used to extend the framework to newly developed technologies, including new features, new device types, and new networking technologies.

Figure 1:
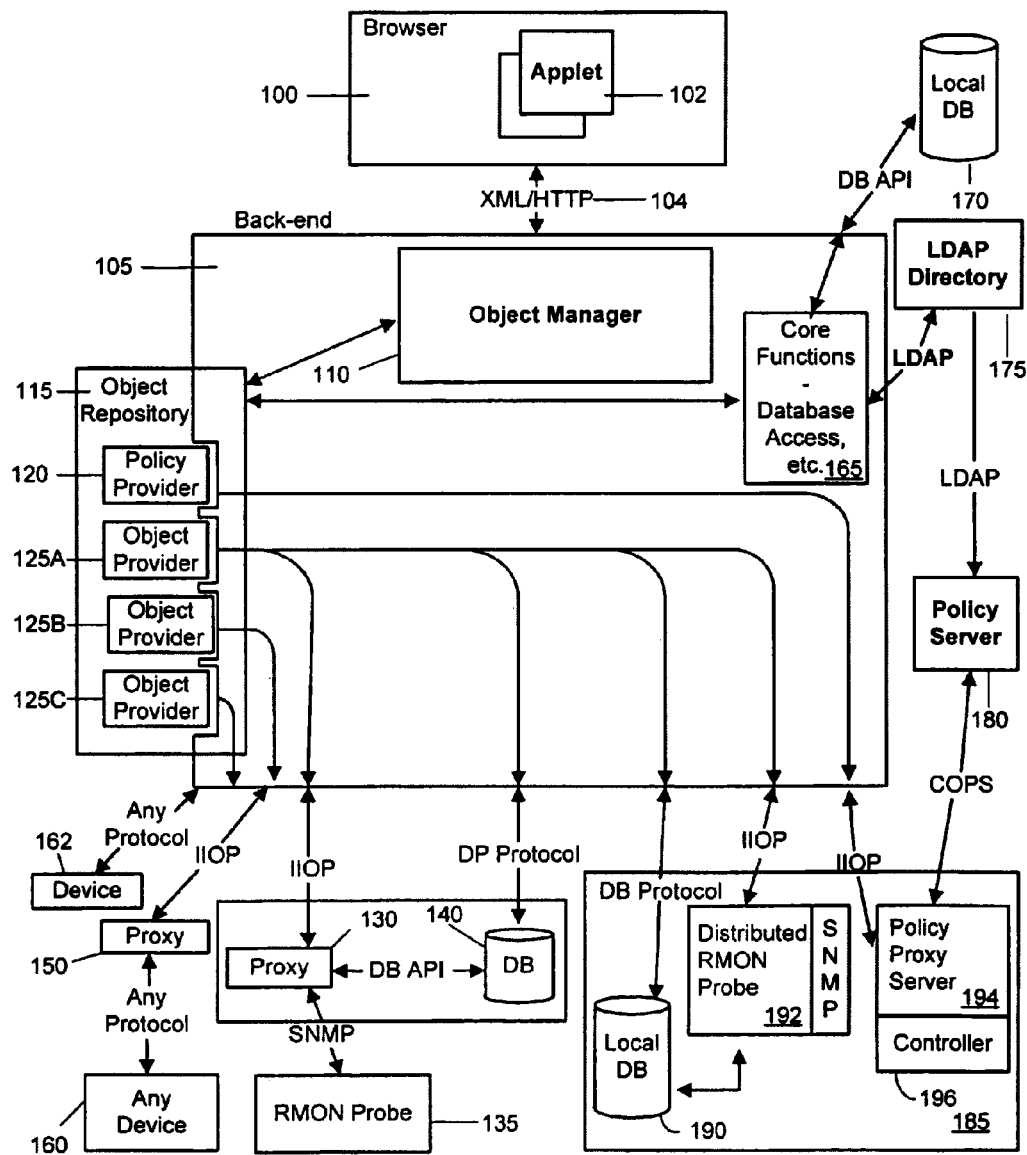
FIG. 1 is a block diagram of an embodiment of the present invention.

Referring now to the drawings, wherein like reference numerals designate identical or corresponding parts, and more particularly to FIG. 1 thereof, there is illustrated a block diagram of an embodiment of the present invention. A browser 100 running a network management user interface (applet 102, for example) interfaces with a back end 105 that has an open architecture for retrieving network management information or data used by the user interface.

The backend's open architecture is a network management framework that is dynamically extensible for new features, new devices types, and new networking technologies. Rather than defining certain requirements for gathering, distributing, or using data, the back end 105 leaves those requirements open so that the new devices, features, and technologies can be supported using plug-in style modules that include definitions of managed objects that include all the necessary programming for gathering, distributing and/or using network data.

Typical network management devices use a protocol, such as Simple Network Management Protocol (SNMP) which is capable of managing many current network devices. However, these network management devices are limited to managing network devices that are SNMP compliant. For example, HP Open View™ is a known network management product that allows adding new management devices, however, HP Open View™ is an SNMP based product and any new devices added need to be SNMP compliant.

In another example, some network management devices utilize software that follow proprietary protocols and data formats. However, again, these devices are limited to managing devices that know the proprietary protocols and data formats.

The present inventors realized the need to be able to add products with new technologies to a network management platform. For example, Palm Pilots (Palm™) have gained extraordinary popularity in recent years. However, these devices are not SNMP devices, but may be networked using other technologies. One of the problems realized is how to communicate with the devices, and how can they be added to a network management platform.

The present invention solves this problem in one of several ways. In one embodiment, the present invention includes a centralized collection server using a protocol. In FIG. 1, the centralized collection server is embodied as, for example, any one of proxy 130, proxy 150, and distributed RMON Probe 192. The centralized collection server collects network management information from any of a number of network devices, including any combination of devices, probes, databases, or other network management information sources. The collected data is stored at the collection server and then communicated to the back end 105 upon either a request, or via a regularly scheduled communication.

Details on how to communicate with the centralized collection server are contained in an object class definitions maintained on the back end 105. The details are contained in plug-in modules referred to as Object Providers (125A, 125B, and 125C, for example). Any number of object providers may be maintained on the back end 105. Each object provider contains at least one object class definition including all facilities needed for retrieving data for class objects. The facilities for retrieving data for the class objects include, for example, device specific programming to retrieve data from a specific device on the network, and generalized programming for retrieving data from network devices that are compliant with a general communications protocol (such as SNMP).

Table 1 is an example class definition for an object provider. As with all code examples contained herein, the class definition of Table 1 is not intended as a compilable or executable code segment, but instead is provided as an example of one or more processes of the present invention.

Class PacketTrafficForPrinters
  TotalNumberOfPackets (Time);
  CurrentTraffic;
  GraphOfTraffic (Time Period);
  GetDataForObjectInstance;
End class;

Table 1 Example Object Class Definition

The object class definition contains various routines for providing data needed for network management, and routines for retrieving data from the network devices or a proxy. For example, the example class includes functions that provide packet traffic information for printers on a network. An object defined of class PacketTrafficForPrinters, for example:

PrintersTrafficObject: PacketTrafficForPrinters;

Contains functions that operate to retrieve Printer traffic information, and provide specific data regarding the Printer Traffic. The specific data, for example, includes the total number of packets sent to printers (PrintersTrafficObject.Total No of Packets (sysclock.time)); Current traffic (PrintersTrafficObject.CurrentTraffic); and Graphs of traffic (PrintersTrafficObject.GraphOfTraffic (Time Period)). Retrieval of Printer Information from the printer devices (or a proxy) is performed by invoking the routine PrinterTrafficObject.GetDataForObjectDistance.

The Object Providers and their object class definition provide all the facilities needed to communicate with either devices or proxies attached to the network. In one embodiment, the proxies are set up to communicate using emerging standards such as Internet Inter Orb Protocol (also known as IIOP). Other inter module communications are also preferably performed using other emerging standards, such as Web Based Enterprise Management (WBEM), Common Information Model (CIM), and XML/HTTP. The Network management Framework (mainly the back end 105) preferably contains a set of centralized routines available to all of the object provider plug-ins that take care of standardized communication tasks using the IIOP protocol. The present invention prefers a Common Object Request Broker Architecture (CORBA) implementation, as defined by the Object Management Group (OMG), that provides communication routines to each of the object providers. Other sets of centralized routines may also be implemented for other types or different communication protocols which are then made available to the object providers. The objects defined by the object provider object class definitions are passed from the proxy to the back end using CORBA's IIOP protocol.

Central to the concept of passing objects from the proxies to the back end 105 is the object manager 110. The object manager manages interactions between management interfaces (which enable network administrators to view and manage data for their networks) and providers (which actually collect this data from their networks). These interactions take place using the managed objects (see Table 1, for example). The object manager also controls an object repository maintained by the object providers which contains a list of classes and the providers for the managed objects.

The object manager 110 retrieves the object class definitions from the object providers and holds them available for use in retrieving instances of the classes held. The object manager 110 retrieves the object classes needed by applet 102 running on browser 100.

Figure 2:
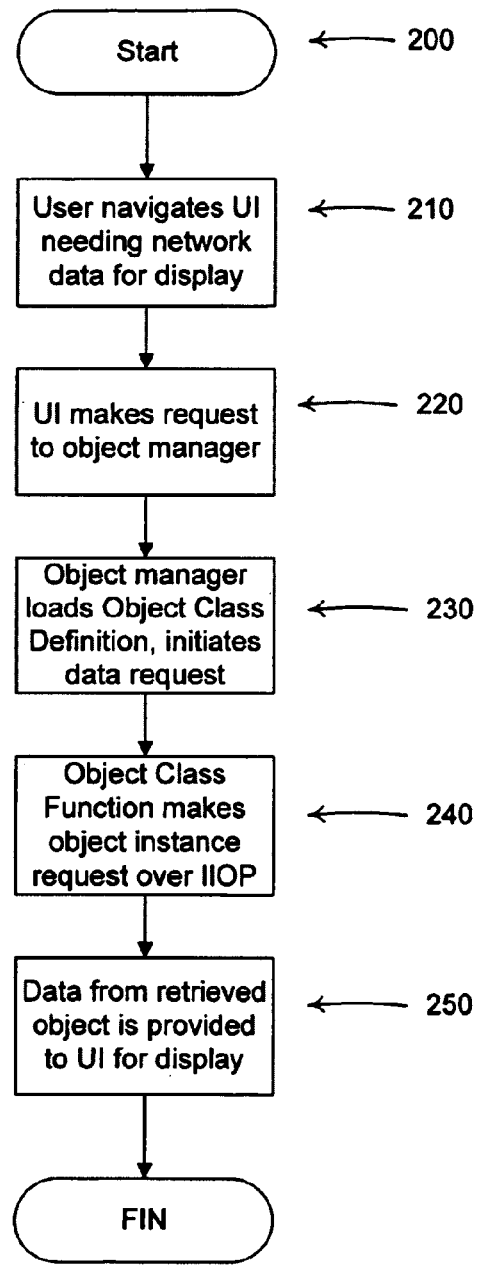
FIG. 2 is a flowchart of an embodiment of the present invention.

An example overall process for retrieving and using an object defined by the object class definitions of an object provider are shown in the flow chart of FIG. 2. At step 200, a user navigating applet 102 invokes a screen that is designed to display printer traffic. A request for printer information is generated by the applet 102 and sent to the back end 105 (step 220). At step 230, the object manager recognizes the object needed to fulfill the data request made by the UI, and, if not already present, retrieves the object class definition for an object that holds the data needed to fulfill the UI request. The object manager determines the needed object by reference to the object repository and scanning the object/provider list. More than one object may be required, and, in that case, multiple object class definitions are retrieved from one or more of the object providers. The retrieved object class definitions are loaded and held by the object manager 110.

At step 240, the object manager 110 invokes a class function for retrieval of an instance of the object class definition. Object instances for each of the object class definitions held by the object manager, or at least the object instances needed to respond to the UI data request are retrieved. Preferably, the object is retrieved by the class function that invokes a remote CORBA method having an underlying implementation of IIOP protocol that handles passing of the object instance from a proxy to the backend 105. In another embodiment, the object may be built by the class function invoked, and the class function utilizes specific communication or data protocols to retrieve the data needed to build the object from a proxy or directly from a network device(s).

At step 250, the object data is forwarded to the UI in response to the UI data request. The data may be displayed in any format. Some example formats are shown in Grace et al., U.S. patent application Ser. No. 09/732,991, filed Dec. 8, 2000, entitled "METHOD FOR CORRELATING AND PRESENTING NETWORK MANAGEMENT DATA," the contents of which are incorporated herein by reference, in their entirety.

Continuing now with FIG. 1, it can be seen that several different methods or connections for delivering data to the back end 105 are envisioned. IIOP communications retrieving object instances from proxy 130 are generally discussed above. The proxy 130 retrieves data, via SNMP, for example, from an RMON Probe 135. The data may also be retrieved from a database 140 via a database (DB) application programming interface (API). SNMP may be utilized to gather data from other devices, and/or other APIs may also be utilized to gather data from specific devices.

Proxy 150 is shown gathering data from any device 160 using any protocol. Devices may also be directly accessed via any protocol supported by the object class definition wishing to retrieve the data (see device 162, for example). When using an any protocol to retrieve data, the object class definition preferably uses a protocol supported by the Network Management Framework (NMF), but may provide its own specialized routines for the communication.

Local DB 190 illustrates another method for communicating data or an object instance to the backend. DB 190 communicates object instances via a DB protocol to the backend 105. The DB protocol is an NMF supported protocol used by an object class function, or is a protocol implemented by the object class. Alternatively, an RMON probe 192 may be set up to query the database 192 and then communicate the retrieved objects/data to the backend 105 using IIOP.

The present invention includes another local database (DB 170) and a set of access mechanisms (core functions and database access 165) for the database. The local database 170 adds persistence and ensures that the Network management framework is scalable and not limited by memory restrictions. The local database 170 provides needed historical data for the generation of reports or reference to a previous time period. Preferably, the database is an object oriented database because it more effectively models the relationship between the managed/management objects (in contrast, HPOpenview type platforms use SQL based databases).

Network devices to be managed may be located using, for example, file lookup, and LDAP (note LDAP directory 175 see LDAP RFC defined by IETF).

A policy server 180 and Policy Proxy server communicate via Common Open Policy Services (COPS) protocol (see COPS RFC, defined by IETF) to administer and set policies. Policies administered include the distribution of bandwidth among competing devices. The policies may be set by using policy rules, such as CIM policy schema based rules, stored persistently in an LDAP accessed directory, for example.

The present invention also facilitates the development of new devices, protocols, and other technologies by providing a framework in which object definitions and how the objects will be used. In the development process, all entities involved in the development of a new device or technology, including the user interface (UI) developers, plug-in developers, and the engineers developing the device to be managed agree on a set of data and other routines needed to retrieve network management data regarding the new technology. UI developers provide input on how the data is best arranged for viewing by a user, and how that data arrangement may facilitate display. An agreed upon object class definition then encompasses these inputs and is utilized for accessing and displaying network information regarding the new technology.

Figure 3:
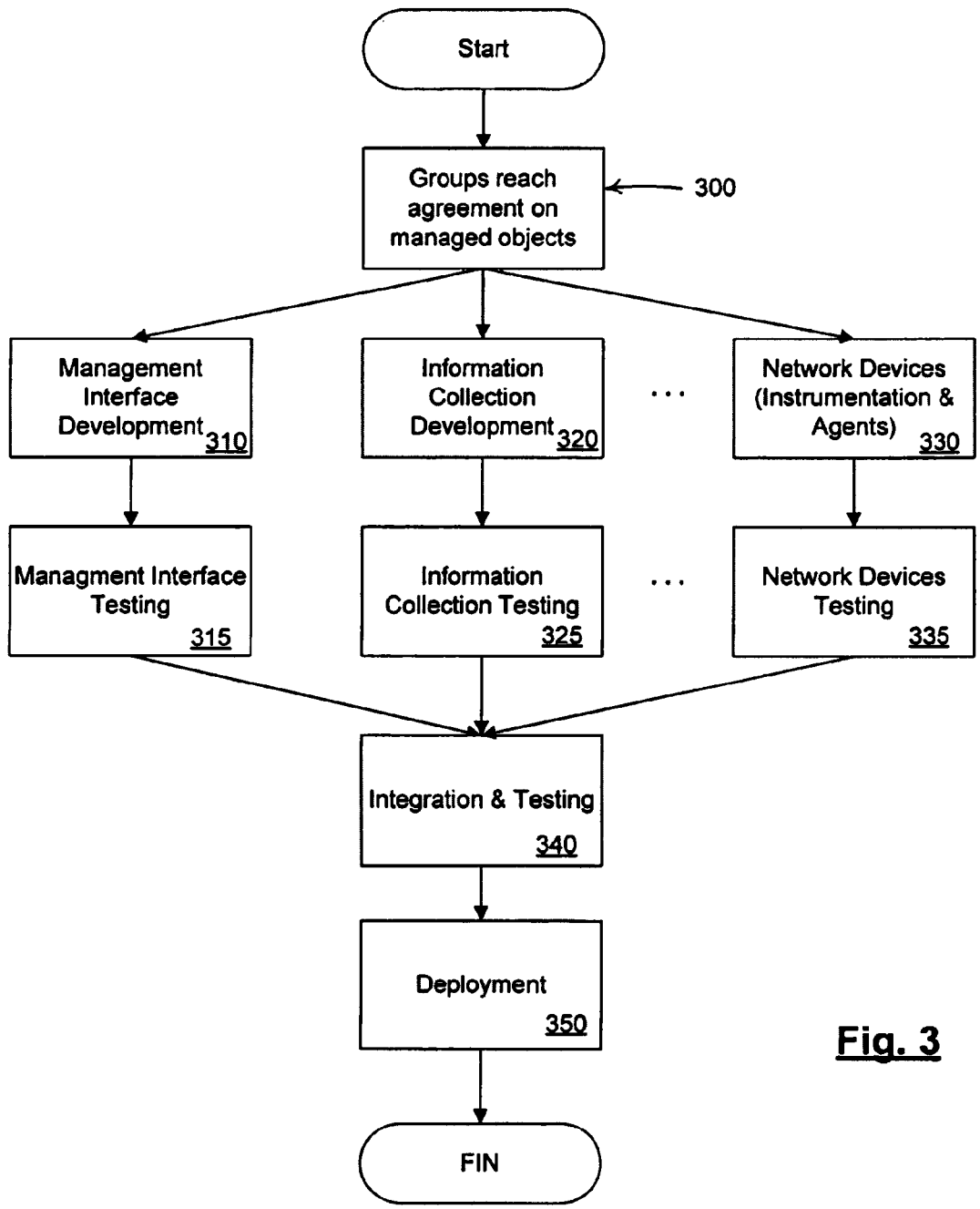
FIG. 3 is a flowchart of one embodiment of a development process for devices constructed consistent with the present invention.

FIG. 3 is a flowchart of one embodiment of a development process for devices constructed consistent with the present invention. The development process is for extending a management platform based on the architecture discussed herein. The management platform extension is to a new class of network devices.

At step 300 separate groups responsible for the development of the management framework extension reach agreement regarding the definitions of the objects to be managed. The separate groups will include, for example, a management interface group, a providers (information collection), and a network devices group).

Once the objects to be managed are defined (see the printer example shown in Table 1), the separate groups develop in parallel each of the required components. At step 310, a management interface is developed. The management interface is based on the defined managed objects and may be organized in many ways. Preferably, the management interface is a GUI. In one embodiment, the management interface is a combination of Java Applets Java Applet 102, for example), XML pages, and HTML pages (or other combinations thereof). These GUI components obtain the relevant network data by communicating with the object manager 110 and accessing the corresponding managed objects. This communication follows the well defined protocol (XML/HTTP 104, for example).

At step 320, Information Collection (provider) routines are developed by the providers group. The providers group develops the functionality for actually collecting information from the network. The information collection process may include the use of a local database for storing and aggregating the data (Local DB 190, for example).

As discussed above, communication between a provider module and a network device may take many forms. For example, the communications may be direct with a network device using a known (SNMP, for example) or proprietary protocol (note device 162 having direct communications). Alternatively, a provider may communicate using a Remote Procedure Call RPC mechanism (IIOP, for example) with a provider proxy (note proxy 130, communicating using IIOP). In this alternative, the proxy communicates with any number of network devices (using SNMP, for example). In FIG. 3, development of the proxy, if utilized, is performed at step 320.

Preferably, a set of classes developed that make up a provider are bundled together in an archive file (JAR file, for example). The JAR file is used so that the class files can be loaded as one unit rather than loading each one seperately. The object repository is then configured to plug the JAR file into the Network Management Framework. The configuration method is, for example, a text file with a JAR list and a run time load command file (load.exe, for example). Alternatively, an ITOP interface may be used (e.g., to remotely load JAR files).

At step 330, the group developing the network devices will provide the necessary instrumentation and agent code for the device to communicate with the management framework. Preferably, the communication use the methods described herein.

Upon completion of the development, the individually developed features are tested (steps 315, 325, and 335), and then integrated (step 340) into a management module. The management module (including the GUI, providers, instrumentation, agent, and proxies, if any) is then deployed (step 350). Deployment includes installation of each of the new network devices and management module at a customer site.

The installation process can use a utility program that is configured to dynamically load the new management module into the network management framework without requiring a shutdown of network management applications or devices. The utility program may be configured as a load command file or IIOP interface. Thus, the new network management module is seamlessly integrated into an existing network management framework.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, identifying requested modules, loading and holding retrieved objects, gathering data via proxy or direct communication with network devices, retrieving instances of objects, forwarding display information to requesting applets, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A framework for a network management device, comprising:
   an object repository having a set of at least one object class definition, each object class definition containing information needed to retrieve instances of an object defined by the corresponding object class definition and configured to maintain data regarding at least one managed device on a network;
   an object manager configured to retrieve at least one object class definition from the object repository and initiate at least one class function of the retrieved objects to retrieve at least one class instance; and
   an interface configured to retrieve data from the class instances and forward it to a user of the network management device;
   wherein said object repository is configured to accept provider plug-in modules configured to hold at least one of said object class definitions;
   the object manager is further configured to scan a provider list and recognize objects needed to fulfill data requests regarding remote network devices from a remote front end device; and
   the object manager is yet further configured to utilize multiple objects recognized from different provider lists and the interface to retrieve data to fulfill the data requests.

2. The framework according to claim 1, wherein at least one of the object class definitions include a proprietary communication routine configured to retrieve data from a data store located on a network.

3. The framework according to claim 2, wherein said communications routine includes an HOP communication protocol.

4. The framework according to claim 2, wherein said data store is a proxy that collects said data from a network device.

5. The framework according to claim 1, wherein at least one of the object class definitions include a communication routine that uses any protocol to communicate with a network device to collect said data regarding at least one managed device on the network.

6. A method, comprising the steps of:
   receiving, at an object manager in a backend receiver, a data request related to network management information from a remotely located front end;
   scanning a provider list;
   recognizing a set of objects in the provider list needed to retrieve and reference the requested data;
   determining if the recognized set of objects have been instantiated at the backend receiver;
   loading the set of objects, at least one having a class hierarchy and class routines capable of retrieving and maintaining the requested data, into the object manager;
   invoking class routines for retrieving instances of the set of objects;
   retrieving the requested data from the object instances; and
   forwarding only the requested data retrived from the object instances to the remotely located front end.

7. The method according to claim 6, wherein said step of invoking class routines for retrieving comprises the steps of calling a set of framework provided mechanisms for communicating with a proxy to retrieve the requested data.

8. The method according to claim 7, wherein said framework provided mechanisms comprises a set of IIOP communication programs.

9. The method according to claim 6, wherein:
   said method is embodied in a set of computer instructions stored on a computer readable media;
   said computer instructions, when loaded into a computer, cause the computer to perform the steps of said method.

10. The method according to claim 9, wherein said computer instruction are compiled computer instructions stored as an executable program on said computer readable media.

11. The method according to claim 9, wherein said computer instruction are compiled computer instructions stored as an interpretable program on said computer readable media.

12. The method according to claim 6, wherein the recognized set of objects include objects recognized from different providers.

13. The method according to claim 6, wherein the backend includes a set of centralized routines available to provider plug-ins installed in the backend that enable communications between the backend and remote network devices having data needed for the recognized set of objects.

14. The method according to claim 13, wherein the centralized routines include communications routines for each of CORBA IIOP, at least one database protocol, and SNMP.

15. The method according to claim 13, wherein the centralized routines include communications routines for each of CORBA IIOP, SNMP, and at least one proprietary protocol.

16. The method according to claim 6, wherein said step of invoking comprises,
    passing the object instances to a remote network device; and
    invoking the class routines at the remote network device.

17. The method according to claim 16, wherein said step of passing comprises passing the object instances to the remote network device via CORBA IIOP.

18. The method according to claim 6, wherein said step of invoking comprises, passing the object instances to a plurality of remote network devices via CORBA IIOP; and invoking the class routines at the remote network devices.

19. The method according to claim 6, wherein said step of invoking comprises, invoking the class routines for retrieving instances of the set of objects at the backend;

utilizing communication routines centralized on the backend to communicate with a plurality of remote network devices to retrieve data referenced by the object instances.

20. The method according to claim 19, wherein the centralized communication routines combine different protocols for communicating with different remote network devices, including at least one remote network device that communicates with the backend using OCRBA IIOP and at least one network communication device that communicates with the backend using SNMP.

21. The method according to claim 19, wherein the centralized communication routines combine different protocols for communicating with different remote network devices, including at least one remote network device that communicates with the backend using CORBA IIOP and at least one network communication device that communicates with the backend using at least one database protocol.

22. The method according to claim 19, wherein the centralized communication routines combine different protocols for communicating with different remote network devices, including at least one remote network device that communicates with the backend using CORBA IIOP and at least one network communication device that communicates with the backend using at least one proprietary communication protocol.

* * * * *